United States Patent
Guo et al.

(10) Patent No.: US 11,792,130 B2
(45) Date of Patent: Oct. 17, 2023

(54) AUDIO/VIDEO COMMUNICATION METHOD, TERMINAL, SERVER, COMPUTER DEVICE, AND STORAGE MEDIUM

(71) Applicant: BOE Technology Group Co., Ltd., Beijing (CN)

(72) Inventors: Xiaoqin Guo, Beijing (CN); Jingyu Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 23 days.

(21) Appl. No.: 17/630,611

(22) PCT Filed: Mar. 10, 2021

(86) PCT No.: PCT/CN2021/080025
§ 371 (c)(1),
(2) Date: Jan. 27, 2022

(87) PCT Pub. No.: WO2021/197008
PCT Pub. Date: Oct. 7, 2021

(65) Prior Publication Data
US 2022/0255866 A1    Aug. 11, 2022

(30) Foreign Application Priority Data
Apr. 2, 2020   (CN) .......................... 202010256111.4

(51) Int. Cl.
*H04L 47/24* (2022.01)
*H04L 47/2416* (2022.01)
(Continued)

(52) U.S. Cl.
CPC ........ *H04L 47/2416* (2013.01); *H04L 65/403* (2013.01); *H04L 65/65* (2022.05); *H04L 65/752* (2022.05); *H04L 69/164* (2013.01)

(58) Field of Classification Search
CPC ... H04L 47/2416; H04L 65/752; H04L 65/65; H04L 65/403; H04L 69/164
See application file for complete search history.

(56) References Cited

U.S. PATENT DOCUMENTS 6,357,028 B1 * 3/2002 Zhu .................... H04N 21/6377
   714/751
10,893,233 B1   1/2021 Guo et al.
(Continued)

FOREIGN PATENT DOCUMENTS

| CN | 101645903 A | 2/2010 |
| CN | 102480618 A | 5/2012 |

(Continued)

OTHER PUBLICATIONS

CN202010256111.4 first office action.

*Primary Examiner* — Brenda H Pham
(74) *Attorney, Agent, or Firm* — IPRO, PLLC (57) ABSTRACT

Disclosed are an audio/video communication method, a terminal, a server, a computer device, and a storage medium. The audio/video communication method is applied to the terminal and includes: access a server and establish an audio/video conversation connection with another terminal by means of the server, collect an audio/video, perform coding compression on the audio/video, and package data after being subject to coding compression into an RTP data packer; and send the RTP data packet to the server on the basis of a UDP protocol, and the server forwards the RTP data packet to the another terminal.

18 Claims, 4 Drawing Sheets

(51) Int. Cl.
*H04L 65/752* (2022.01)
*H04L 65/65* (2022.01)
*H04L 65/403* (2022.01)
*H04L 69/164* (2022.01)

(56) References Cited

U.S. PATENT DOCUMENTS

2007/0153827 A1 7/2007 Lee
2016/0007067 A1* 1/2016 Lai ................... H04N 21/2743
　　　　　　　　　　　　　　　　　　725/62

FOREIGN PATENT DOCUMENTS

| CN | 105282110 A | 1/2016 |
| CN | 106686351 A | 5/2017 |
| CN | 108234080 A | 6/2018 |
| CN | 109547467 A | 3/2019 |
| CN | 110706824 A | 1/2020 |

* cited by examiner

AUDIO/VIDEO COMMUNICATION METHOD, TERMINAL, SERVER, COMPUTER DEVICE, AND STORAGE MEDIUM

CROSS-REFERENCE TO RELATED APPLICATIONS

The present disclosure is a US National Stage of International Application No. PCT/CN2021/080025, filed on Mar. 10, 2021, which claims priority to the Chinese Patent Application No. 202010256111.4, filed to China Patent Office on Apr. 2, 2020, and entitled "AUDIO/VIDEO COMMUNICATION METHOD, TERMINAL, SERVER, COMPUTER DEVICE, AND STORAGE MEDIUM", the entire contents of which are incorporated herein by reference.

FIELD

The present disclosure relates to the field of communications, in particular to an audio/video communication method, a terminal, a server, a computer device, and a storage medium.

BACKGROUND

With the development of Internet technology, the need of streaming media services for low-delay audio/video interaction is increasingly strong in business scenarios of telemedicine, online education, video conference and other industries. At present, a large part of live video streaming is based on an RTMP streaming media protocol, and a TCP-based data transmission process is excessively complicated, so audio/video transmission delay of a whole link is usually 1 to 3 seconds, which cannot meet the need for low-delay interaction; and a UDP protocol itself involves no concept of connection, does not require three-way handshake or various complicated transmission characteristics, and has better real-time performance than TCP, but its transmission mechanism has the problem of unreliable transmission.

SUMMARY

A first embodiment of the present disclosure provides an audio/video communication method, applied to a terminal, including: accessing a server and establishing an audio/video session connection with another terminal through the server; collecting an audio/video, performing coding compression on the audio/video, and packaging data after being subjected to the coding compression into an RTP data packet; and sending the RTP data packet to the server on the basis of a UDP protocol to enable the server to forward the RTP data packet to the another terminal.

Optionally, the audio/video communication method provided by the first embodiment of the present disclosure further includes: receiving, on the basis of the UDP protocol, an RTP data packet sent by the another terminal and forwarded by the server, and decoding and playing an audio/video of the RTP data packet sent by the another terminal and forwarded by the server.

Optionally, in the audio/video communication method provided by the first embodiment of the present disclosure, the terminal further includes a sending window buffer area, configured to save all RTP data packets sent within a first time threshold range.

After the sending the RTP data packet to the server on the basis of the UDP protocol, the method further includes: resending, in response to a packet loss message sent by the another terminal, a corresponding RTP data packet in the sending window buffer area. The packet loss message is sent by the another terminal upon in a transmission time cycle after a moment of detecting packet loss.

Optionally, in the audio/video communication method provided by the first embodiment of the present disclosure, the terminal further includes a sending window buffer area, configured to save all RTP data packets sent within a first time threshold range.

After the sending the RTP data packet to the server on the basis of the UDP protocol, the method further includes: receiving a confirmation message sent by the another terminal, and deleting, according to a correspondence relation between the confirmation message and the RTP data packet, continuous RTP data packets including a minimum sequence number in the sending window buffer area.

Optionally, in the audio/video communication method provided by the first embodiment of the present disclosure, the terminal further includes a sending window buffer area, a first counter and a second counter. The sending window buffer area is configured to save all RTP data packets sent within a first time threshold range, the first counter is configured to record a timestamp of an RTP data packet with an earliest sending time in the sending window buffer area, and the second counter is configured to record a timestamp of an RTP data packet with a latest sending time in the sending window buffer area.

After the sending the RTP data packet to the server on the basis of the UDP protocol, the method further includes: obtaining link delay in real time according to the timestamp recorded by the first counter and the timestamp recorded by the second counter; and adjusting a coding rate of the coding compression in real time according to the link delay.

Optionally, in the audio/video communication method provided by the first embodiment of the present disclosure, the adjusting the coding rate of the coding compression in real time according to the link delay includes: in a case that the link delay is larger than a preset congestion threshold, calculating a real-time link bandwidth according to an RTP data packet confirmed by the another terminal and received within a second time threshold range, and adjusting the coding rate of the coding compression according to the real-time link bandwidth; and in a case that the link delay is smaller than the preset congestion threshold, adjusting the coding rate of the coding compression according to the link delay.

Optionally, in the audio/video communication method provided by the first embodiment of the present disclosure, after the sending the RTP data packet to the server on the basis of the UDP protocol, the method further includes: in a case that the link delay is larger than a preset congestion threshold, deleting data of audio/video frames outside a third time threshold range in the RTP data packets in the sending window buffer area.

Optionally, in the audio/video communication method provided by the first embodiment of the present disclosure, the terminal further includes a receiving window buffer area, configured to save all RTP data packets received within a fourth time threshold range.

After the receiving, on the basis of the UDP protocol, the RTP data packet sent by the another terminal and forwarded by the server, and decoding and playing the audio/video of the RTP data packet sent by the another terminal and forwarded by the server, the method further includes: inferring an expected sequence number of an RTP data packet to be received according to the received RTP data packet in the receiving window buffer area; in a case that a sequence number of a newly received RTP data packet is larger than the expected sequence number, judging that packet loss exists, and obtaining a quantity of lost RTP data packets and sequence numbers of the lost RTP data packets; and in a case that no corresponding RTP data packet is received within a transmission time cycle after a moment of detecting packet loss of the RTP data packets, generating a packet loss message containing the sequence numbers of the RTP data packets that are not received, and sending the packet loss message to the another terminal to request for retransmission.

Optionally, in the audio/video communication method provided by the first embodiment of the present disclosure, the terminal further includes a playing buffer area.

The receiving, on the basis of the UDP protocol, the RTP data packet sent by the another terminal and forwarded by the server, and decoding and playing the audio/video of the RTP data packet sent by the another terminal and forwarded by the server further includes: obtaining audio/video data of the another terminal by de-packaging the received RTP data packet; and forming audio/video frames according to the audio/video data of the another terminal saved in the playing buffer area, and adjusting playing states of the audio/video frames according to a fifth time threshold. The playing states include a buffer state and a to-be-played state, and the fifth time threshold is dynamically adjusted according to the quantity of lost RTP data packets and a transmission time cycle.

Optionally, in the audio/video communication method provided by the first embodiment of the present disclosure, the receiving, on the basis of the UDP protocol, the RTP data packet sent by the another terminal and forwarded by the server, and decoding and playing the audio/video of the RTP data packet sent by the another terminal and forwarded by the server further includes: splicing picture frames according to the playing states of the audio/video frames, and decoding the audio/video frames based on playing time and performing render playing.

A second embodiment of the present disclosure provides an audio/video communication method, applied to a server, including: receiving access requests of a first terminal and a second terminal respectively, and establishing audio/video session connections with the first terminal and the second terminal; and receiving an RTP data packet sent by one of the first terminal and the second terminal on the basis of an UDP protocol, and forwarding the RTP data packet to the other one of the first terminal and the second terminal. The RTP data packet is obtained through performing coding compression on and packaging, by the first terminal or the second terminal, a collected audio/video so that the other one of the first terminal and the second terminal receives the RTP data packet on the basis of the UDP protocol, and decodes and plays an audio/video of the RTP data packet.

A third embodiment of the present disclosure provides a terminal, including: an accessing circuit, configured to access a server, and establish an audio/video session connection with another terminal through the server; a collecting and coding circuit, configured to collect an audio/video, perform coding compression on the audio/video, and package data after being subjected to the coding compression into an RTP data packet; and a sending circuit, configured to send the RTP data packet to the server on the basis of a UDP protocol to enable the server to forward the RTP data packet to the another terminal.

Optionally, the terminal provided by the third embodiment of the present disclosure further includes: a receiving circuit, configured to receive, on the basis of the UDP protocol, an RTP data packet sent by the another terminal and forwarded by the server, and decode and play an audio/video of the RTP data packet sent by the another terminal and forwarded by the server.

A fourth embodiment of the present disclosure provides a server, including: a signaling interaction circuit, configured to receive access requests of a first terminal and a second terminal respectively, and establish audio/video session connections with the first terminal and the second terminal; and a forwarding circuit, configured to receive an RTP data packet sent by one of the first terminal and the second terminal on the basis of an UDP protocol, and forward the RTP data packet to the other one of the first terminal and the second terminal. The RTP data packet is obtained through performing coding compression on and packaging, by the first terminal or the second terminal, a collected audio/video so that the other one of the first terminal and the second terminal receives the RTP data packet on the basis of the UDP protocol, and decodes and plays an audio/video of the RTP data packet.

A fifth embodiment of the present disclosure provides a computer readable storage medium, storing a computer program thereupon. The program, when being executed by a processor, realizes the method according to the first embodiment; or the program, when being executed by the processor, realizes the method according to the second embodiment.

A sixth embodiment of the present disclosure provides a computer device, including a memory, a processor and a computer program that is stored on the memory and can be run on the processor. The processor, when executing the program, realizes the method according to the first embodiment; or the processor, when executing the program, realizes the method according to the second embodiment.

DETAILED DESCRIPTION OF THE EMBODIMENTS

In order to explain the present disclosure more clearly, the present disclosure will be further described below in conjunction with preferred embodiments and the accompanying drawings. Similar components in the drawings are denoted by the same reference numerals. Those of skill in the art should understand that the content specifically described below is illustrative rather than restrictive, and should not be used to limit the scope of protection of the present disclosure.

It should be noted that "on", "formed on" and "disposed on" herein can mean that one layer is directly formed or disposed on another layer, or can mean that the layer is indirectly formed or disposed on the another layer, that is, there are other layers between the two layers. In this document, unless otherwise specified, the term "located on the same layer" used means that two layers, parts, components, elements or parts can be formed by the same patterning process, and the two layers, parts, components, elements or parts are generally formed by the same material. In this document, unless otherwise specified, the expression "patterning process" generally includes the steps of photoresist coating, exposure, development, etching, and photoresist stripping. The expression "one-time patterning process" means a process of forming patterned layers, parts, components, etc., using one mask.

Figure 1:
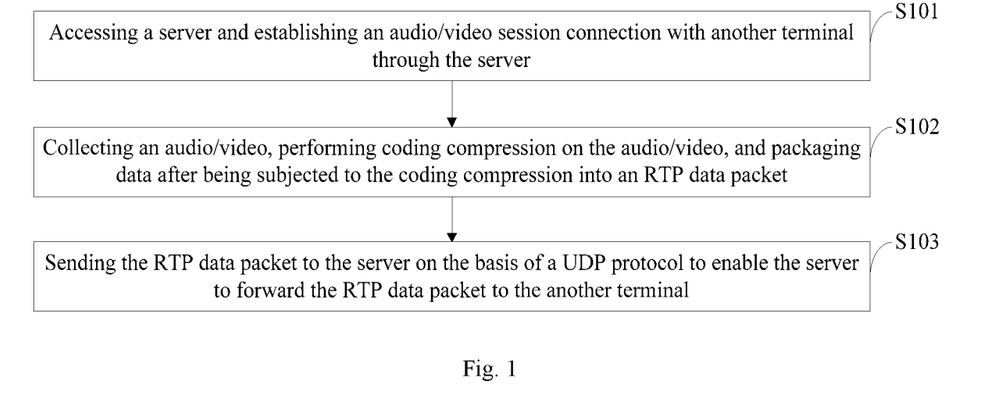
FIG. 1 illustrates a flow chart of an audio/video communication method provided by some embodiments of the present disclosure.

As shown in FIG. 1, some embodiments of the present disclosure provide an audio/video communication method, applied to a terminal, and including the following steps.

S101, a server is accessed, and an audio/video session connection with another terminal is established through the server.

S102, an audio/video is collected, coding compression is performed on the audio/video, and the data after being subjected to coding compression is packaged into an RTP data packet.

S103, the RTP data packet is sent to the server on the basis of a UDP protocol, and the server forwards the RTP data packet to the another terminal.

Figure 2:
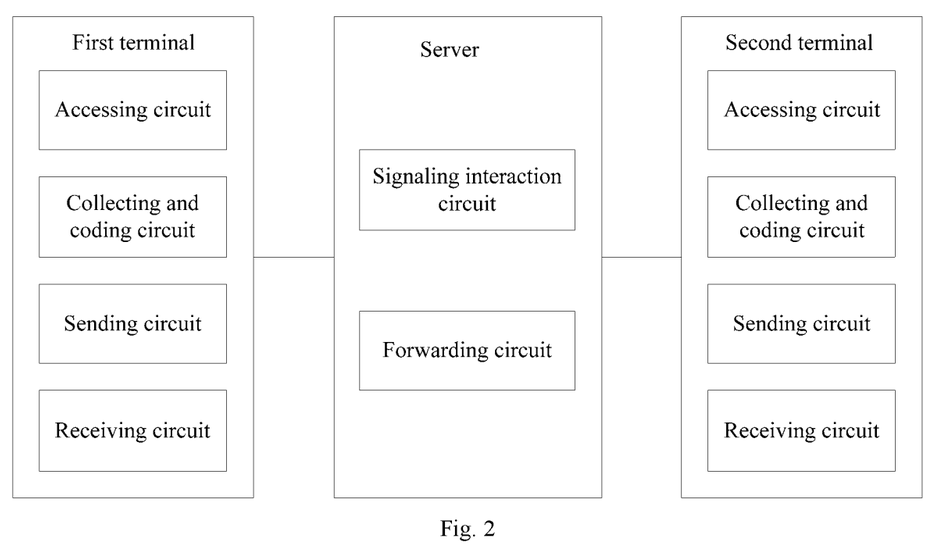
FIG. 2 illustrates a schematic diagram of a scenario of an audio/video communication system provided by some embodiments of the present disclosure.

In one specific embodiment, an audio/video communication system using the audio/video communication method is shown in FIG. 2. A first terminal and a second terminal are the same terminal. The terminal may be a computer or may be a terminal communication apparatus such as a smart phone or a PAD. The terminal specifically includes an accessing circuit, a collecting and coding circuit, a sending circuit, and a receiving circuit. The server specifically includes a signaling interaction circuit and a forwarding circuit. The server may be a practical server deployed in application scenarios or may be a cloud server. The terminal is applied to different users. For example, a doctor user and a patient user in an online remote medical business scenario, a teacher user and a student user in an online education business scenario, or a host user, a speaker user and a participant user in a video conference business scenario may use the terminal to realize real-time online high-definition audio/video communication through the server.

Description will be made below taking the online remote medical business scenario as an example. The above audio/video communication method provided by the embodiments of the present disclosure specifically includes the following procedures.

First, the first terminal accesses the server and establishes the audio/video session connection with the second terminal through the server.

In the embodiments, the first terminal and the second terminal access the server through the accessing circuit respectively. For example, the connection with the server is established through an SDP session request, i.e. the first terminal and the second terminal establish an audio/video session connection channel based on signaling interaction.

Then, the first terminal collects the audio/video, performs coding compression on the audio/video and packages the data after being subjected to coding compression into the RTP data packet.

In the embodiments, the first terminal collects the audio and video of a terminal user through the collecting and coding circuit. For example, when a user of the first terminal is a patient and a user of the second terminal is a doctor, the patient's description of pathogenic condition is collected through the collecting and coding circuit of the first terminal.

Specifically, a camera of the collecting and coding circuit may be used to collect and record the audio/video, data of the audio/video is coded by a coder of the collecting and coding circuit, and the coded data is packaged into the RTP data packet.

Then, the first terminal sends the RTP data packet to the server on the basis of the UDP protocol, and the server forwards the RTP data packet and sends the RTP data packet to the second terminal.

The first terminal sends the packaged RTP data packet to the forwarding circuit of the server according to the UDP protocol through the sending circuit, and the forwarding circuit of the server forwards the RTP data packet to the receiving circuit of the second terminal. In the meantime, considering transmission unreliability of the UDP protocol itself, implementation steps are added to a transmission process to improve reliability of transmission. The RTP data packet is forwarded to the second terminal used by the doctor through the server, so that the second terminal receives the audio/video in the RTP data packet according to the UDP protocol, and therefore, the first terminal and the second terminal realizes real-time high-definition audio/video communication on the basis of the UDP protocol and through the server.

In one optional embodiment, the terminal may include a sending window buffer area, configured to save all RTP data packets sent within a first time threshold range. After S103, i.e., the RTP data packet is sent to the server on the basis of the UDP protocol, the method may further include: in response to a packet loss message sent by the another terminal, a corresponding RTP data packet in the sending window buffer area is resent. The packet loss message is sent by the another terminal upon in a transmission time cycle after a moment of detecting packet loss.

In the embodiments, the sending circuit of each terminal includes a sending window buffer area, and the sending window buffer area is configured to realize a retransmission function. Specifically, the sending window buffer area saves all RTP data packets sent within certain time. In the embodiments, a first time threshold may be, for example, 5 seconds, which is not limited in the present disclosure, and those of skill in the art should set a value of the first time threshold according to practical application needs. At present, a packet loss retransmission mechanism is usually set on a sending terminal in a data transmission process, i.e. when a receiving side feeds back that no data packet is received, the sending terminal resends the data packet. However, the existing retransmission mechanism has the problem of repeated sending of data packets, therefore resulting in waste of bandwidth and network congestion.

Based on the problem, a packet loss retransmission mechanism provided by the embodiments is set as follows. The sending circuit of the first terminal realizes retransmission through a pull mode. When the second terminal, as a receiving side, detects packet loss, the second terminal does not feedback on packet loss immediately. Instead, the second terminal waits for a transmission time cycle after detecting packet loss, and if the data packet is still not received, the second terminal then feeds back on packet loss to the first terminal, as a sending side, so that the sending window buffer area of the sending circuit of the first terminal performs retransmission according to a fed-back sequence number of the data packet. The transmission time cycle is usually the time needed by data transmission within the first terminal and the second terminal. If the data packet is still not received within a transmission time cycle range, it is then determined that data needs to be retransmitted. For example, a segment ack feedback message containing the sequence number of the lost data packet is created to the sending side, so that waste of bandwidth and network congestion caused by out-of-order arrival of data packets in the transmission process are avoided.

Meanwhile, considering congestion control of the sending side, in one optional embodiment, the terminal may further include a sending window buffer area, configured to save all RTP data packets sent within the first time threshold range. After step S103, i.e., the RTP data packet is sent to the server on the basis of the UDP protocol, the method may further include: a confirmation message sent by the another terminal is received, and continuous RTP data packets including a minimum sequence number in the sending window buffer area are deleted according to a correspondence relation between the confirmation message and the RTP data packet.

In the embodiments, considering that the RTP data packets buffered in the sending window buffer area are designed for packet loss retransmission, all RTP data packets that are being sent and are not yet confirmed by the receiving side are saved. In case of network congestion, a plurality of RTP data packets are being sent in the sending window buffer area of the sending circuit of the first terminal, so in order to mitigate congestion and lower delay, the entire buffer area needs to be checked; and if an H.264 GOP group exceeding certain threshold time exits, a message of a video frame is removed from the sending window buffer area, an I-frame ID and a message ID of a next GOP group are simultaneously sent to the receiving terminal; and upon receiving the simultaneous messages, the receiving terminal sets a latest continuous ID into the synchronized ID. If excessive overdue frames are discarded, picture freezing of a video will be caused, which indicates that a current network is not suitable for transmitting a high-resolution video, and the video is directly set into a lower resolution.

Specifically: when the sending circuit receives the confirmation message fed back by the second terminal as the receiving side, the sending window buffer area deletes continuous RTP data packets including the minimum sequence number in the confirmation message according to the correspondence relation between the confirmation message and the RTP data packet. For example, if the first terminal, as the sending side, sends RTP data packets with sequence numbers of 1, 2, 3, 4, and 5, while the second terminal, as the receiving side, receives RTP data packets with sequence numbers of 1, 2, 4, and 5, the second terminal sends the confirmation message to the first terminal, the confirmation message includes labels of corresponding RTP data packets, such as sequence number. The first terminal receives the confirmation message and determines the corresponding RTP data packets according to the labels in the confirmation message, i.e. the first terminal acknowledges that the second terminal receives the RTP data packets with the sequence numbers of 1, 2, 4, and 5; and at the moment, the RTP data packet with the minimum sequence number is 1, the continuous RTP data packets including the minimum sequence number 1 include the RTP data packets with the sequence numbers of 1 and 2, and the sending window buffer area deletes all RTP data packets with a sequence number smaller than or equal to 2. At the moment, the minimum sequence number is 3, and if the second terminal further receives a data packet with a sequence number of 3 and sends a confirmation message to the first terminal, the first terminal determines that the sequence number of the continuous RTP data packets including the minimum sequence number 3 is 5, and the sending window buffer area deletes all RTP data packets with a sequence number smaller than or equal to 5 corresponding to the message, i.e. the RTP data packets with the sequence numbers of 3, 4, and 5.

In order to further control congestion control of the sending side, in one optional embodiment, the terminal may further include the sending window buffer area, a first counter and a second counter simultaneously. The sending window buffer area is configured to save all RTP data packets sent within the first time threshold range, the first counter is configured to record a timestamp of an RTP data packet with an earliest sending time in the sending window buffer area, and the second counter is configured to record a timestamp of an RTP data packet with a latest sending time in the sending window buffer area. After step S103, i.e., the RTP data packet is sent to the server on the basis of the UDP protocol, the method may further include: link delay is obtained in real time according to the timestamps recorded by the first counter and the second counter, and a coding rate of the coding compression is adjusted in real time according to the link delay.

In the embodiments, the first counter is used to record a timestamp of a message with the earliest sending time in the sending window buffer area, and the second counter is used to record a timestamp of a currently sent message in the sending window buffer area; and the real-time link delay is obtained according to the first counter and the second counter, i.e. a difference between the timestamp of the first counter and the timestamp of the second counter, and the coding rate of the coder of the collecting and coding circuit is adjusted in real time according to the link delay, thereby adjusting the coding rate of the coding compression by the coder in real time according to the real-time link delay.

In particular, in one optional embodiment, the adjusting the coding rate of the coding compression in real time according to the time delay may specifically include: if the link delay is larger than a preset congestion threshold, a real-time link bandwidth is calculated according to an RTP data packet confirmed by the another terminal and received within a second time threshold range, and the coding rate of the coding compression is adjusted according to the real-time link bandwidth; and if the link delay is smaller than the preset congestion threshold, the coding rate of the coding compression is adjusted according to the link delay.

In the embodiments, the coding rate of the coding compression by the coder is adjusted in real time through the preset congestion threshold and the obtained real-time link bandwidth. Specifically, for example, a bandwidth value is calculated according to a size of data received and confirmed by the second terminal as the receiving side within the last 30 seconds, the bandwidth value is fed back to the coder of the collecting and coding circuit of the first terminal as the sending side, and the coder adjusts the coding rate in real time according to the received bandwidth value. That is, in case of network congestion, the coding rate of the coder is lowered, and when network congestion is improved, the coding rate of the coder is gradually recovered.

In order to further lower delay of audio/video transmission, in one optional embodiment, after the above step S103, i.e., the RTP data packet is sent to the server on the basis of the UDP protocol, the method may further include: if the link delay is larger than the preset congestion threshold, data of audio/video frames outside a third time threshold range in the RTP data packets in the sending window buffer area is deleted.

In the embodiments, data of audio/video frames within a certain time range stored in the sending window buffer area is deleted according to the link delay, so as to reduce data of audio/video frames stored in the sending window buffer area and to therefore mitigate link delay under a current network transmission environment. In the embodiments, a third time threshold may be, for example, 1 second, which is not limited in the present disclosure. Those of skill in the art should perform setting according to practical application needs, which is not repeated here.

Finally, the first terminal receives, on the basis of the UDP protocol, the RTP data packet sent by the another terminal and forwarded by the server, and decodes and plays the audio/video of the RTP data packet sent by the another terminal and forwarded by the server.

In the embodiments, the receiving circuit of the first terminal receives, in a UDP mode, the RTP data packet forwarded by the server, and parses and decodes the received RTP data packet to obtain the audio/video data sent by the second terminal, for example, obtain the doctor's inquiry on pathogenic condition or notes on medicine using, thereby improving transmission reliability of the UDP mode and lowering transmission delay of the RTP data packet.

Specifically, in one optional embodiment, the terminal may further include a receiving window buffer area, configured to save all RTP data packets received within a fourth time threshold range. After the receiving, on the basis of the UDP protocol, the RTP data packet sent by the another terminal and forwarded by the server, and decoding and playing the audio/video of the RTP data packet sent by the another terminal and forwarded by the server, the method may further include: inferring an expected sequence number of an RTP data packet to be received according to the received RTP data packet in the receiving window buffer area; if a sequence number of a newly received RTP data packet is larger than the expected sequence number, judging that packet loss exists, and the quantity of lost packets and sequence numbers of the lost RTP data packets are obtained; and if no corresponding RTP data packet is received within a transmission time cycle after a moment of detecting packet loss of the RTP data packets, generating a packet loss message containing the sequence numbers of the RTP data packets that are not received and sending the packet loss message to the another terminal to request for retransmission.

In the embodiments, packet loss detection and lost packet sequence number management are performed by the receiving window buffer area arranged at the receiving circuit of the first terminal. The packet loss detection specifically includes: assuming that the maximum sequence number of RTP data packet currently received is 5, the sequence number of the RTP data packet to be received is inferred to be 6, and if the sequence number of the RTP data packet newly received is 8, i.e. the sequence number of the RTP data packet newly received is larger than the inferred sequence number of the RTP data packet, it is indicated that packet loss exists, the quantity of lost RTP data packets is 2, and the sequence numbers of the RTP data packets are 6 and 7. In order to avoid excessive retransmission caused by out-of-order arrival of the received RTP data packets in the transmission process, at the moment, the first terminal does not send the sequence numbers of the lost RTP data packets or a transmission request to the second terminal. Instead, the first terminal waists for the time by one transmission time cycle on the basis of the moment of detecting packet loss, and if the lost RTP data packets are still not received within the time range, the first terminal sends packet loss feedback to the second terminal to request the second terminal to perform retransmission.

Considering that the first terminal performs stable playing according to the received RTP data packets, in one optional embodiment, the terminal may further include a playing buffer area. The receiving, on the basis of the UDP protocol, the RTP data packet sent by the another terminal and forwarded by the server, and decoding and playing the audio/video of the RTP data packet sent by the another terminal and forwarded by the server may include: obtaining audio/video data of the another terminal by de-packaging the received RTP data packet; and forming audio/video frames according to the audio/video data of the another terminal saved in the playing buffer area, and adjusting playing states of the audio/video frames according to a fifth time threshold. The playing states include a buffer state and a to-be-played state, and the fifth time threshold may be dynamically adjusted according to the quantity of packet loss and a transmission time cycle.

In the embodiments, by setting the playing buffer area on the receiving circuit to prevent playing jitter and cope with packet loss retransmission, a video steam can be played according to a frequency of collection. The playing buffer area divides the audio/video data received into the audio/video frames and ranks the audio/video frames according to the sequence numbers of the audio/video frames so as to facilitate sequential playing. At the same time, a state of each audio/video frame is set; and when the state of an audio/video frame is waiting, it means the audio/video frame is in a buffer state, i.e. cannot be played at the moment, and when the state of the audio/video frame is playing, it means that the audio/video frame is in a to-be-played state and the audio/video frame is waiting to be decoded and played by the receiving circuit.

Specifically the following step 1 and step 2 are provided.

Step 1, each audio/video frame is initially set to be the buffer state waiting.

Step 2, the receiving circuit includes the two counters which are configured to record a timestamp of a newest audio/video frame and a timestamp of a latest audio/video frame in the playing buffer area so as to obtain a difference between timestamps of the two frames, and it is judged whether the different is larger than the preset fifth time threshold. If the difference is larger than the fifth time threshold, the state of the audio/video frame is set to be the to-be-played state playing.

It should be noted that, if the playing buffer area is set to be excessively large, delay is increased, and if the playing buffer area is set to be excessively small, a phenomenon of video freezing will appear. In the embodiments, adjusting the state of the audio/video frame through setting the fifth time threshold that may be dynamically adjusted is specifically as follows: the time of transmitting the RTP data packet between the first terminal and the second terminal is set as a transmission time cycle, and a size of the playing buffer area is estimated and set based on the quantity of the lost packets in the transmission process. That is, the fifth time threshold is dynamically adjusted according to the quantity of the lost packets and one transmission time cycle, thereby dynamically adjusting the size of the playing buffer area.

It is worth noting that, if no packet loss and retransmission occur within unit time, the fifth time threshold may be appropriately lowered to reduce delay, for example, the fifth time threshold is set to be playing time of one frame of the audio/video data, and only one frame of the audio/video data is buffered in the playing buffer area. If the fifth time threshold is set to be excessively large due to intermittent fluctuation of the network, thereby increasing the playing buffer area and resulting in increase of delay, the fifth time threshold will be dynamically lowered again after the network returns to normal, so as to reduce delay. Therefore, by dynamically adjusting the size of the playing buffer area through the dynamically set fifth time threshold, the playing states of the audio/video frames are adjusted.

In one optional embodiment, the receiving, on the basis of the UDP protocol, the RTP data packet sent by the another terminal and forwarded by the server, and decoding and playing the audio/video of the RTP data packet sent by the another terminal and forwarded by the server may further include: splicing picture frames according to the playing states of the audio/video frames, decoding the audio/video frames based on the playing time and performing render playing. Specifically the following step 3 is further provided.

Step 3, whether an audio/video frame in the to-be-played state may be played is judged.

In the embodiments, whether or not to decode and play the audio/video frame in the to-be-played state is judged from two aspects. On the one hand, the audio/video frame in the to-be-played state needs to meet time requirements of playing, and on the other hand, audio/video frames in the to-be-played state need to make up for a playing volume of a frame of audio/video.

Step 4, if the audio/video frames may be played, the audio/video frames are subjected to interface rendering and are played.

In the embodiments, the audio/video frames are decoded and contents of the audio/video frames are played through the receiving circuit of the first terminal.

So far, real-time online high-definition video communication between the patient using the first terminal and the doctor using the second terminal through the UDP mode are realized.

Compared with a three-way handshake connection mode adopted by TCP, the embodiment adopts the UDP protocol and specific implementation steps, complexity of a communication connection process between the terminals can be effectively lowered, time of establishing the communication connection is shortened, transmission delay in the communication process is reduced, and reliability of real-time transmission is improved, i.e. reliability of data transmission is provided on the basis of reducing transmission delay and stable transmission and low delay of the audio/video are guaranteed under condition of an unstable network.

Figure 3:
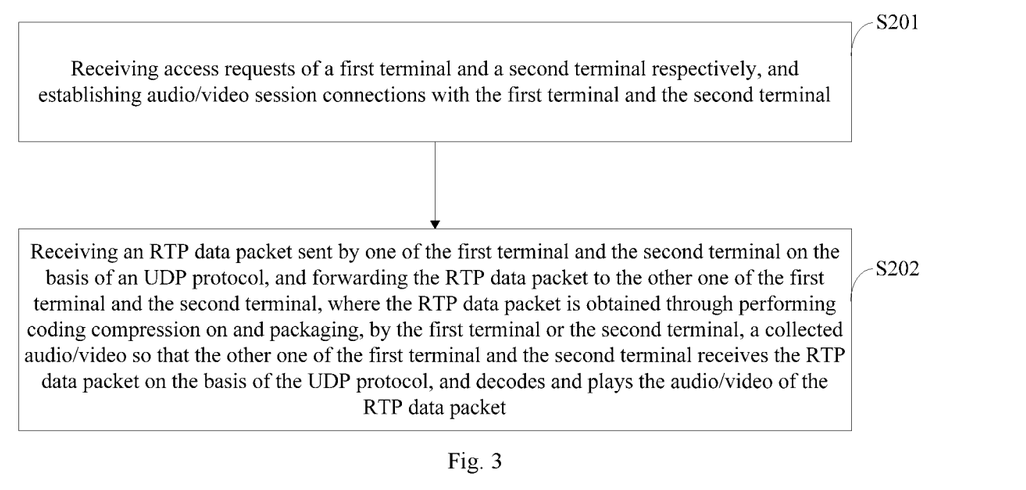
FIG. 3 illustrates a flow chart of an audio/video communication method provided by other embodiments of the present disclosure.

Corresponding to the above audio/video communication method, another embodiment of the present disclosure further provides an audio/video communication method applied to a server. As shown in FIG. 3, the audio/video communication method specifically includes the following steps.

S201, access requests of a first terminal and a second terminal are received respectively, and audio/video session connections with the first terminal and the second terminal are established.

S202, an RTP data packet sent by one of the first terminal and the second terminal on the basis of an UDP protocol is received and is forwarded to the other one of the first terminal and the second terminal. The RTP data packet is obtained through performing coding compression on and packaging, by the first terminal or the second terminal, a collected audio/video so that the other one of the first terminal and the second terminal receives the RTP data packet on the basis of the UDP protocol, and decodes and plays an audio/video of the RTP data packet.

Specific implementations of the embodiment are similar to the above audio/video communication method, which will not be repeated herein.

Corresponding to the audio/video communication method provided by the above embodiment, another embodiment of the present disclosure further provides a terminal using the audio/video communication method and a server using the audio/video communication method. Because the terminal and the server provided by the embodiment of the present disclosure correspond to the audio/video communication method provided by the above embodiments, the foregoing implementations are applicable to the terminal and the server provided by the embodiment of the present disclosure as well, which will not be described in detail in the embodiment.

As shown in FIG. 2, another embodiment of the present disclosure further provides a terminal using the audio/video communication method, including an accessing circuit, a collecting and coding circuit, and a sending circuit. The accessing circuit is configured to access a server, and establish an audio/video session connection with another terminal through the server; the collecting and coding circuit is configured to collect an audio/video, perform coding compression on the audio/video, and package data after being subjected to the coding compression into an RTP data packet; and the sending circuit is configured to send the RTP data packet to the server on the basis of a UDP protocol to enable the server to forward the RTP data packet to the another terminal.

In one optional embodiment, the terminal may further include: a receiving circuit, configured to receive, on the basis of the UDP protocol, an RTP data packet sent by the another terminal and forwarded by the server, and decode and play an audio/video of the RTP data packet sent by the another terminal and forwarded by the server.

Similarly, as shown in FIG. 2, another embodiment of the present disclosure further provides a server using the audio/video communication method, including a signaling interaction circuit and a forwarding circuit. The signaling interaction circuit is configured to receive access requests of a first terminal and a second terminal respectively, and establish audio/video session connections with the first terminal and the second terminal; and the forwarding circuit is configured to receive an RTP data packet sent by one of the first terminal and the second terminal on the basis of an UDP protocol, and forward the RTP data packet to the other one of the first terminal and the second terminal. The RTP data packet is obtained through performing coding compression on and packaging, by the first terminal or the second terminal, a collected audio/video so that the other one of the first terminal and the second terminal receives the RTP data packet on the basis of the UDP protocol, and decodes and plays an audio/video of the RTP data packet.

Another embodiment of the present disclosure further provides a computer readable storage medium, storing a computer program thereupon. When being executed by a processor, the program realizes: accessing a server and establishing an audio/video session connection with another terminal through the server; collecting an audio/video, performing coding compression on the audio/video, and packaging data after being subjected to coding compression into an RTP data packet; and sending the RTP data packet to the server on the basis of a UDP protocol, and forwarding, by the server, the RTP data packet to the another terminal.

Another embodiment of the present disclosure further provides another computer readable storage medium, storing a computer program thereupon. When being executed by a processor, the program realizes: receiving access requests of a first terminal and a second terminal respectively, and establishing audio/video session connections with the first terminal and the second terminal; and receiving an RTP data packet sent by one of the first terminal and the second terminal on the basis of an UDP protocol, and forwarding the RTP data packet to the other one of the first terminal and the second terminal. The RTP data packet is obtained through performing coding compression on and packaging, by the first terminal or the second terminal, a collected audio/video so that the other one of the first terminal and the second terminal receives the RTP data packet on the basis of the UDP protocol, and decodes and plays the audio/video of the RTP data packet.

In practical application, the computer readable storage medium may adopt any combination of one or more computer readable media. The computer readable media may be a computer readable signal medium or a computer readable storage medium. The computer readable storage medium may be, for example, but are not limited to, an electrical, magnetic, optical, electromagnetic, infrared, or semiconductor system, apparatus, or device, or a combination of any of the above. More specific examples (non-exhaustive list) of the computer readable storage medium include: an electrical connection with one or more wires, a portable computer disk, a hard disk, a random access memory (RAM), a read-only memory (ROM), an erasable programmable read-only memory (EPROM or flash memory), optical fiber, a portable compact disk read-only memory (CD-ROM), an optical storage device, a magnetic storage device, or any suitable combination of the above. In the embodiment, the computer readable storage medium may be any tangible medium that contains or stores a program, and the program may be used by or in combination with an instruction execution system, apparatus, or device.

The computer readable signal medium may include a data signal propagated in baseband or as a part of a carrier wave, and a computer readable program code is carried therein. The propagated data signal may adopt many forms, including but not limited to electromagnetic signals, optical signals, or any suitable combination of the above. The computer readable signal medium may also be any computer readable medium other than the computer readable storage medium. The computer readable medium may send, propagate or transmit the program for use by or in combination with the instruction execution system, apparatus, or device.

The program code contained on the computer readable medium may be transmitted by any suitable medium, including but not limited to wireless, wire, optical cable, RF, etc., or any suitable combination of the above.

The computer program code used to perform operations of the present disclosure may be written in one or more programming languages or a combination thereof. The programming languages include object-oriented programming languages, such as Java, Smalltalk, and C++, and also include conventional procedural programming language, such as "C" language or similar programming languages. The program code may be executed entirely on a user's computer, executed partly on the user's computer, executed as an independent software package, executed partly on the user's computer and partly on a remote computer, or executed entirely on the remote computer or a server. In a case involving the remote computer, the remote computer may be connected to the user's computer through any kind of network, including a local area network (LAN) or a wide area network (WAN), or it may be connected to an external computer (for example, connected through the Internet by using an Internet service provider).

Figure 4:
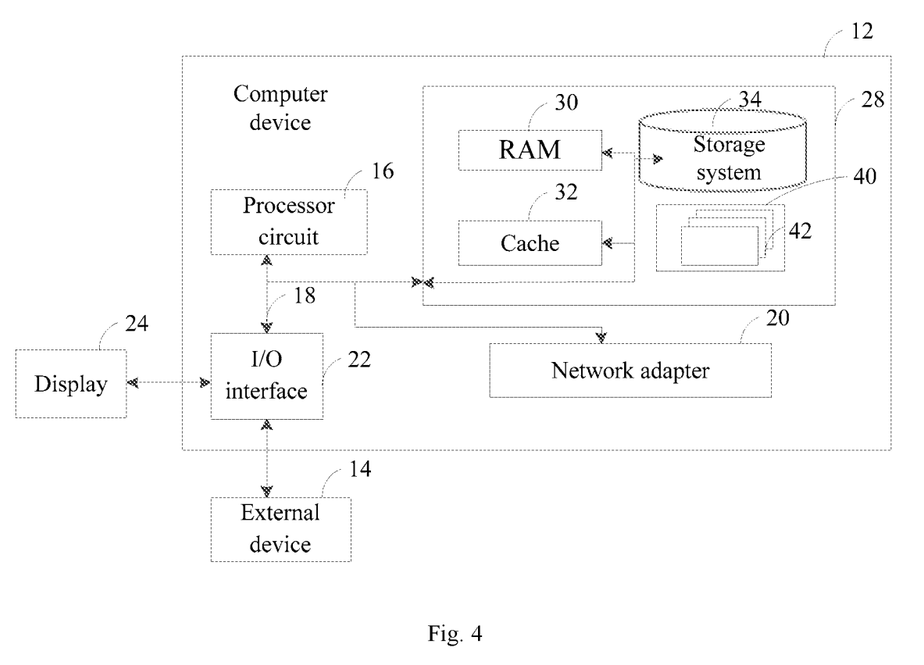
FIG. 4 illustrates a schematic structural diagram of a computer device provided by some embodiments of the present disclosure.

FIG. 4 is a schematic structural diagram of a computer device further provided by another embodiment of the present disclosure. The computer device 12 shown in FIG. 4 is merely an example, and should not bring any limitation to functions and using scope of the embodiment of the present disclosure.

As shown in FIG. 4, the computer device 12 is represented in a form of a general purpose computing device. Components of the computer device 12 may include, but are not limited to: one or more processors or processor circuits 16, a system memory 28, and a bus 18 connecting different system components (including the system memory 28 and the processor circuits 16).

The bus 18 represents one or more of several types of bus structures, including a memory bus or a memory controller, a peripheral bus, an accelerated graphics port, a processor, or a local bus using any of the various bus structures. For example, these architectures include but are not limited to an industry standard architecture (ISA) bus, a microchannel architecture (MAC) bus, an enhanced ISA bus, a Video Electronics Standards Association (VESA) local bus, and a peripheral component interconnection (PCI) bus.

The computer device 12 typically includes a variety of computer system readable media. These media may be any available media that can be accessed by the computer device 12, including volatile and nonvolatile media, and removable and non-removable media.

The system memory 28 may include a computer system readable medium in a form of a volatile memory, such as a random access memory (RAM) 30 and/or a cache memory 32. The computer device 12 may further include other removable/non-removable, volatile/nonvolatile computer system storage media. Merely for example, a storage system 34 may be used to read and write a non-removable, non-volatile magnetic medium (not shown in FIG. 4, usually referred to as a "hard drive"). Although not shown in FIG. 4, a disk drive used for reading and writing of a removable non-volatile disk (such as a "floppy disk") and an optical disc drive for reading and writing of a removable non-volatile optical disk (such as a CD-ROM, a DVD-ROM or other optical media) may be provided. In these cases, each drive may be connected to the bus 18 through one or more data media ports. The memory 28 may include at least one program product, the program product having a set of (for example, at least one) program modules, and these program modules are configured to perform functions of the embodiments of the present disclosure.

A program/utility tool having the set of (at least one) program modules 42 may be stored in, for example, the memory 28. Such program modules 42 include but are not limited to an operating system, one or more application programs, and other program modules as well as program data. Each of these examples or some combination thereof may include the realization of a network environment. The program modules 42 generally execute the functions and/or methods in the embodiments described in the present disclosure.

The computer device 12 may also communicate with one or more external devices 14 (such as a keyboard, a pointing device, a display 24, etc.), and may also communicate with one or more devices that enable a user to interact with the computer device 12, and/or communicate with any device (such as a network card, a modem, etc.) that enables the computer device 12 to communicate with one or more other computing devices. The communication may be performed through an input/output (I/O) interface 22. In addition, the computer device 12 may also communicate with one or more networks (for example, a local area network (LAN), a wide area network (WAN), and/or a public network, such as the Internet) through a network adapter 20. As shown in FIG.

4, the network adapter 20 communicates with other modules of the computer device 12 through the bus 18. It should be understood that although not shown in FIG. 4, other hardware and/or software modules may be used in conjunction with the computer device 12, including but not limited to: micro codes, device drivers, redundant processing circuits, external disk drive arrays, RAID systems, tape drives and data backup storage systems, etc.

The processor circuit 16 executes various functional applications and data processing by running the program stored in the system memory 28, such as implementing an audio/video communication method provided by an embodiment of the present disclosure.

Based on current existing problems, the present disclosure formulates an audio/video communication method, a terminal, a server, a computer device and a storage medium, real-time high-definition audio/video transmission is performed based on a UDP protocol and specific implementation steps. While audio/video transmission reliability is improved, delay of audio/video transmission is effectively lowered, thereby remedying the problems existing in the prior art, and achieving a wide range of application prospects.

Obviously, the above-mentioned embodiments of the present disclosure are merely examples to clearly illustrate the present disclosure, and are not intended to limit the implementations of the present disclosure. For those of ordinary skill in the art, on the basis of the foregoing descriptions, other different forms of variations or changes can also be made, and it is not possible to list all the implementations here. Any obvious variations or changes derived from the technical solutions of the present disclosure are still within the scope of protection of the present disclosure.

What is claimed is:

1. An audio/video communication method, applied to a terminal, and comprising:
   accessing a server and establishing an audio/video session connection with another terminal through the server;
   collecting an audio/video, performing coding compression on the audio/video, and packaging data after being subjected to the coding compression into an Real-time Transport Protocol (RTP) data packet; and
   sending the RTP data packet to the server on the basis of a User Datagram Protocol (UDP) protocol to enable the server to forward the RTP data packet to the another terminal;
   wherein the terminal comprises a sending window buffer area, configured to save all RTP data packets sent within a first time threshold range; and
   after the sending the RTP data packet to the server on the basis of the UDP protocol, the method further comprises:
   resending, in response to a packet loss message sent by the another terminal, a corresponding RTP data packet in the sending window buffer area, wherein the packet loss message is sent by the another terminal upon in a transmission time cycle after a moment of detecting packet loss.

2. The audio/video communication method according to claim 1, further comprising:
   receiving, on the basis of the UDP protocol, an RTP data packet sent by the another terminal and forwarded by the server, and
   decoding and playing an audio/video of the RTP data packet sent by the another terminal and forwarded by the server.

3. The audio/video communication method according to claim 2, wherein the terminal further comprises a receiving window buffer area, configured to save all RTP data packets received within a fourth time threshold range; and
   after the receiving, on the basis of the UDP protocol, the RTP data packet sent by the another terminal and forwarded by the server, and decoding and playing the audio/video of the RTP data packet sent by the another terminal and forwarded by the server, the method further comprises:
   inferring an expected sequence number of an RTP data packet to be received according to the received RTP data packet in the receiving window buffer area;
   in a case that a sequence number of a newly received RTP data packet is larger than the expected sequence number, judging that packet loss exists, and obtaining a quantity of lost RTP data packets and sequence numbers of the lost RTP data packets; and
   in a case that no corresponding RTP data packet is received within a transmission time cycle after a moment of detecting packet loss of the RTP data packets, generating a packet loss message containing the sequence numbers of the RTP data packets that are not received, and sending the packet loss message to the another terminal to request for retransmission.

4. The audio/video communication method according to claim 3, wherein the terminal further comprises a playing buffer area; and
   the receiving, on the basis of the UDP protocol, the RTP data packet sent by the another terminal and forwarded by the server, and decoding and playing the audio/video of the RTP data packet sent by the another terminal and forwarded by the server, comprises:
   obtaining audio/video data of the another terminal by de-packaging the received RTP data packet; and
   forming audio/video frames according to the audio/video data of the another terminal saved in the playing buffer area, and adjusting playing states of the audio/video frames according to a fifth time threshold, wherein the playing states comprise a buffer state and a to-be-played state, and the fifth time threshold is dynamically adjusted according to the quantity of lost RTP data packets and a transmission time cycle.

5. The audio/video communication method according to claim 4, wherein the receiving, on the basis of the UDP protocol, the RTP data packet sent by the another terminal and forwarded by the server, and decoding and playing the audio/video of the RTP data packet sent by the another terminal and forwarded by the server comprises:
   splicing picture frames according to the playing states of the audio/video frames, and decoding the audio/video frames based on playing time and performing render playing.

6. The audio/video communication method according to claim 1, wherein
   after the sending the RTP data packet to the server on the basis of the UDP protocol, the method further comprises:
   receiving a confirmation message sent by the another terminal, and deleting, according to a correspondence relation between the confirmation message and the RTP data packet, continuous RTP data packets comprising a minimum sequence number in the sending window buffer area.

7. The audio/video communication method according to claim 1, wherein the terminal further comprises a first counter and a second counter, the first counter is configured to record a timestamp of an RTP data packet with an earliest sending time in the sending window buffer area, and the second counter is configured to record a timestamp of an RTP data packet with a latest sending time in the sending window buffer area; and after the sending the RTP data packet to the server on the basis of the UDP protocol, the method further comprises:

obtaining link delay in real time according to the timestamp recorded by the first counter and the timestamp recorded by the second counter; and adjusting a coding rate of the coding compression in real time according to the link delay.

8. The audio/video communication method according to claim 7, wherein the adjusting the coding rate of the coding compression in real time according to the link delay comprises:

in a case that the link delay is larger than a preset congestion threshold, calculating a real-time link bandwidth according to an RTP data packet confirmed by the another terminal and received within a second time threshold range, and adjusting the coding rate of the coding compression according to the real-time link bandwidth; and in a case that the link delay is smaller than the preset congestion threshold, adjusting the coding rate of the coding compression according to the link delay.

9. The audio/video communication method according to claim 7, wherein after the sending the RTP data packet to the server on the basis of the UDP protocol, the method further comprises:

in a case that the link delay is larger than a preset congestion threshold, deleting data of audio/video frames outside a third time threshold range in the RTP data packets in the sending window buffer area.

10. A terminal, comprising:

an accessing circuit, configured to access a server, and establish an audio/video session connection with another terminal through the server;

a collecting and coding circuit, configured to collect an audio/video, perform coding compression on the audio/video, and package data after being subjected to the coding compression into an RTP data packet; and a sending circuit, configured to send the RTP data packet to the server on the basis of a UDP protocol to enable the server to forward the RTP data packet to the another terminal;

wherein the terminal further comprises a sending window buffer area, configured to save all RTP data packets sent within a first time threshold range; and the sending circuit is further configured to:

resend, in response to a packet loss message sent by the another terminal, a corresponding RTP data packet in the sending window buffer area, wherein the packet loss message is sent by the another terminal upon in a transmission time cycle after a moment of detecting packet loss.

11. The terminal according to claim 10, further comprising a receiving circuit, configured to receive, on the basis of the UDP protocol, an RTP data packet sent by the another terminal and forwarded by the server, and decode and play an audio/video of the RTP data packet sent by the another terminal and forwarded by the server.

12. The terminal according to claim 11, wherein the terminal further comprises a receiving window buffer area, configured to save all RTP data packets received within a fourth time threshold range; and the receiving circuit is further configured to:

infer an expected sequence number of an RTP data packet to be received according to the received RTP data packet in the receiving window buffer area;

in a case that a sequence number of a newly received RTP data packet is larger than the expected sequence number, judge that packet loss exists, and obtaining a quantity of lost RTP data packets and sequence numbers of the lost RTP data packets; and in a case that no corresponding RTP data packet is received within a transmission time cycle after a moment of detecting packet loss of the RTP data packets, generate a packet loss message containing the sequence numbers of the RTP data packets that are not received, and send the packet loss message to the another terminal to request for retransmission.

13. The terminal according to claim 12, wherein the terminal further comprises a playing buffer area; and the receiving circuit is further configured to:

obtain audio/video data of the another terminal by de-packaging the received RTP data packet; and form audio/video frames according to the audio/video data of the another terminal saved in the playing buffer area, and adjust playing states of the audio/video frames according to a fifth time threshold, wherein the playing states comprise a buffer state and a to-be-played state, and the fifth time threshold is dynamically adjusted according to the quantity of lost RTP data packets and a transmission time cycle.

14. The terminal according to claim 13, wherein the receiving circuit is further configured to:

splice picture frames according to the playing states of the audio/video frames, and decode the audio/video frames based on playing time and perform render playing.

15. The terminal according to claim 10, further comprising:

a receiving circuit, configured to receive a confirmation message sent by the another terminal, and delete, according to a correspondence relation between the confirmation message and the RTP data packet, continuous RTP data packets comprising a minimum sequence number in the sending window buffer area.

16. The terminal according to claim 10, wherein the terminal further comprises, a first counter and a second counter, the first counter is configured to record a timestamp of an RTP data packet with an earliest sending time in the sending window buffer area, and the second counter is configured to record a timestamp of an RTP data packet with a latest sending time in the sending window buffer area; and the terminal further comprises a receiving circuit, configured to:

obtain link delay in real time according to the timestamp recorded by the first counter and the timestamp recorded by the second counter; and adjust a coding rate of the coding compression in real time according to the link delay.

17. The terminal according to claim 16, wherein the receiving circuit is further configured to:

in a case that the link delay is larger than a preset congestion threshold, calculate a real-time link bandwidth according to an RTP data packet confirmed by the another terminal and received within a second time threshold range, and adjust the coding rate of the coding compression according to the real-time link bandwidth; and in a case that the link delay is smaller than the preset congestion threshold, adjust the coding rate of the coding compression according to the link delay.

18. The terminal according to claim 16, wherein the receiving circuit is further configured to:

in a case that the link delay is larger than a preset congestion threshold, delete data of audio/video frames outside a third time threshold range in the RTP data packets in the sending window buffer area.

* * * * *